United States Patent
Naef et al.

(10) Patent No.: US 10,821,414 B2
(45) Date of Patent: Nov. 3, 2020

(54) DEVICE FOR THE THERMAL TREATMENT OF VISCOUS MATERIAL, IN PARTICULAR FOR THE THERMAL SEPARATION OF MATERIAL COMPONENTS CONTAINED IN VISCOUS MATERIAL

(71) Applicants: BUSS-SMS-CANZLER GMBH, Butzbach (DE); WACKER CHEMIE AG, Munich (DE)

(72) Inventors: Rainer Naef, Dietikon (CH); Johann Schuster, Munich (DE); Nils Becker, Munich (DE)

(73) Assignees: BUSS-SMS-CANZLER GMBH, Butzbach (DE); WACKER CHEMIE AG, Munich (DE)

( * ) Notice: Subject to any disclaimer, the term of this patent is extended or adjusted under 35 U.S.C. 154(b) by 0 days.

(21) Appl. No.: 16/272,121

(22) Filed: Feb. 11, 2019

(65) Prior Publication Data
US 2019/0247823 A1 Aug. 15, 2019

(30) Foreign Application Priority Data
Feb. 9, 2018 (EP) .................................. 18156079

(51) Int. Cl.
*B01D 3/12* (2006.01)
*B01D 1/22* (2006.01)
(Continued)

(52) U.S. Cl.
CPC .............. *B01J 19/20* (2013.01); *B01D 1/225* (2013.01); *B01D 3/12* (2013.01); *B01J 19/1812* (2013.01); *B01J 2208/00867* (2013.01)

(58) Field of Classification Search
CPC ........ B01D 1/223; B01D 1/225; B01D 1/226; B01D 1/228; B01D 3/12; B01D 3/28
(Continued)

(56) References Cited

U.S. PATENT DOCUMENTS 2,546,381 A * 3/1951 Zahm ..................... B01D 1/225
159/6.2
3,292,683 A 12/1966 Buchi et al.
(Continued)

FOREIGN PATENT DOCUMENTS

AT 505 461 A1 1/2009
CH 453297 A 6/1968
(Continued)

OTHER PUBLICATIONS

Jun. 28, 2018 European Search Report issued in European Patent Application No. 18 15 6079.

*Primary Examiner* — Jonathan Luke Pilcher
(74) *Attorney, Agent, or Firm* — Oliff PLC

(57) ABSTRACT

A housing having a heatable housing jacket, which surrounds a treatment chamber and forms a rotationally symmetrical treatment surface extending in the axial direction, and a drivable rotor, arranged in the treatment chamber and extending coaxially, for producing a material film on the treatment surface. The rotor comprises a hollow shaft, arranged in a manner distributed over the circumference of which are spreading elements. The hollow shaft surrounds a condensation space, in which a condenser is arranged. At least some of the spreading elements are configured as transport elements, which impart a transporting component to the material in the direction from the material inlet to the material outlet. Some of the spreading elements are configured as transport elements and some as distributing elements, which project from the hollow shaft and which
(Continued)

comprise teeth, the shearing edge of which encloses an angle of less than 45° relative to the axial direction.

16 Claims, 9 Drawing Sheets

(51) Int. Cl.
*B01J 19/20* (2006.01)
*B01J 19/18* (2006.01)
(58) Field of Classification Search
USPC .......................................... 159/6.2
See application file for complete search history.

(56) References Cited

U.S. PATENT DOCUMENTS

| | | | | |
|---|---|---|---|---|
| 3,474,850 A | * | 10/1969 | Germerdonk | B01D 1/225 159/6.2 |
| 3,695,327 A | * | 10/1972 | Widmer | B01D 1/225 159/6.2 |
| 4,981,554 A | * | 1/1991 | Loconsolo | B01D 1/225 159/6.1 |
| 5,534,113 A | * | 7/1996 | Quigley | B01D 1/225 159/49 |
| 7,591,930 B2 | * | 9/2009 | Glasl | B01D 1/225 202/176 |

FOREIGN PATENT DOCUMENTS

| | | |
|---|---|---|
| DE | 1444326 A1 | 12/1968 |
| DE | 195 35 817 A1 | 4/1996 |
| DE | 100 24 418 A1 | 11/2001 |
| EP | 2039408 A1 | 3/2009 |
| EP | 2039409 A1 | 3/2009 |
| EP | 2 147 708 A1 | 1/2010 |
| JP | H06-182101 A | 7/1994 |

* cited by examiner

DEVICE FOR THE THERMAL TREATMENT OF VISCOUS MATERIAL, IN PARTICULAR FOR THE THERMAL SEPARATION OF MATERIAL COMPONENTS CONTAINED IN VISCOUS MATERIAL

The invention relates to a device for the thermal treatment of viscous material, in particular for the thermal separation of material components contained in viscous material, in accordance with the preamble of claim 1 and, in particular, a short-path evaporator.

Short-path evaporators are used for the thermal treatment of temperature-sensitive materials with the aim of concentrating or devolatilizing the material respectively of selectively distilling the gaseous material components that escape from the material during this process.

The principle of short-path evaporation is based on heating a mixture of substances fed to the evaporator, referred to in the following as "material", on a treatment surface forming an evaporation surface and on condensing the gaseous material components that escape during this process on a condenser surface situated opposite the evaporation surface. During this process, the spacing selected between the evaporation surface and the condenser surface is very small in order to minimize pressure losses along the path from the evaporation surface to the condenser surface. This makes it possible to operate in short-path evaporators at very low operating pressures down to 0.001 mbar and correspondingly low boiling temperatures.

Illustrative short-path evaporators are described in EP 2 039 408 A1 and EP 2 039 409 A1, for example.

Thus, in EP 2 039 408 A1, there is a description specifically of a short-path evaporator which, above the condenser, has a disk-shaped rotor plate, which is rotatable about the longitudinal axis of the housing, which rotates during operation and on the peripheral edge region of which there is arranged a suspension assembly with distributing means arranged circumferentially thereon for distributing the material supplied on the evaporation surface. Specifically, these distributing means can, according to EP 2 039 408, be in the form of wiper blades, which are arranged at regular intervals in the circumferential direction and offset relative to one another in the axial direction in such a way that they lie on a spiral extending around the longitudinal axis.

The short-path evaporators described in EP 2 039 408 A1 and EP 2 039 409 A1 are designed for relatively low-viscosity mixtures of substances, which flow downward on the evaporation surface owing to gravity and are spread continuously on the evaporation surface in this way, thereby increasing the dwell time.

DE 1 444 326 A furthermore describes a device for evaporating, separating or distilling liquids having a heated support surface, which is rotationally symmetrical with respect to a vertical axis and on which the liquid can flow downward in a thin layer. To spread the liquid layer on the support surface, use is made here of a spreading member which extends in the form of a helical line, which is rotatable about the axis and to which axial oscillation can be imparted during the rotary motion, producing interference waves in the liquid layer.

However, the short-path evaporators described in EP 2 039 408 A1, EP 2 039 409 A1 and DE 1 444 326 are unsuitable or of only limited suitability for materials or mixtures of substances of high viscosity. Thus, the upper viscosity limit for conventional short-path evaporators is normally about 25 Pas since it must be ensured that the stock to be treated can flow downward under the action of gravity.

DE 195 35 817 A1 is concerned with the thermal treatment of high-viscosity products while simultaneously ensuring uniform distribution of the stock to be treated on the treatment surface. In this context, a device is described which has a core tube, to which angular web plates arranged parallel to the rotor axis are welded, on the outer side of which plates blade elements are arranged in a helical pattern. Although the dwell time of viscous material can be shortened thereby in comparison with the distributing elements or spreading members described above, the device is of only limited suitability for treating very high-viscosity materials, especially materials with a viscosity well above 25 Pas.

Thus, it is the object of the invention to make available a device for the thermal treatment of material, in particular for the thermal separation of material components contained in the material, which makes it possible, in the case of temperature-sensitive materials, to achieve good separation of material components contained in the material even when the material has a very high viscosity, in particular a viscosity higher than 100 Pas, more specifically higher than 1000 Pas.

The object according to the invention is achieved by the device as claimed in claim 1. Preferred embodiments are given in the dependent claims.

As mentioned at the outset, the device is designed for the thermal treatment of viscous material, in particular for the thermal separation of material components contained in viscous material. In particular, it relates to a short-path evaporator.

The device comprises a housing having a heatable housing jacket, which surrounds a treatment chamber and forms a rotationally symmetrical treatment surface extending in the axial direction. Typically, the device is aligned vertically; the axial direction to which reference is made in the context of the present invention thus generally corresponds to the vertical.

A material inlet for introducing the material to be treated into the treatment chamber is arranged in an inlet region of the housing, while a material outlet for discharging the material out of the treatment chamber is arranged in an outlet region of the housing. In the case of the vertically aligned device, this material outlet is thus arranged in a lower region of the housing, while the material inlet is arranged further up.

The device furthermore has a drivable rotor, which is arranged in the treatment chamber and extends coaxially, for producing a material film on the treatment surface, wherein the rotor comprises a hollow shaft, arranged in a manner distributed over the circumference of which are spreading elements, the radially outer, i.e. peripheral, end of which is spaced apart from the treatment surface. Typically, the spacing between the peripheral end of the spreading elements and the treatment surface is in a range of from about 1 to 5 mm, while, in some cases, especially in the case of devices with a very large volume, it can be up to 8 mm.

The hollow shaft surrounds a condensation space, in which a, usually static, condenser is arranged, and has through openings, through which gaseous material components escaping from the material during the thermal treatment can enter the condensation space. The hollow shaft is generally of cylindrical, in particular circular-cylindrical, configuration, wherein the through openings are arranged in the lateral surface of the cylinder.

At least some of the spreading elements are configured as transport elements, which impart a transporting component to the material in the direction from the material inlet to the material outlet, that is to say generally downward.

According to the invention, at least in a longitudinal section of the rotor, especially in a central longitudinal section, some of the spreading elements are configured as transport elements and some as distributing elements, which project from the hollow shaft and which comprise teeth, the shearing edge of which encloses an angle of less than 45° relative to the axial direction.

According to the invention, therefore, there are spreading elements which primarily have a transporting function and which thus form a transport element and spreading elements which primarily assume a distributing function and thus form distributing elements.

On the one hand, the presence of the transport elements ensures that even very high-viscosity materials can be transported through the treatment chamber at a sufficiently high rate and thus the dwell time or treatment duration during which the material is exposed to elevated temperatures and high shear rates can be kept sufficiently short. On the other hand, the presence of the distributing elements ensures very good distribution and optimum surface renewal on the treatment surface, even when the material has a very high viscosity.

Finally, it is thus possible, according to the invention, to achieve optimum treatment, in particular a high devolatilization rate, of very high-viscosity material and, at the same time, to limit the energy input to the material to a level at which the material does not suffer any damage and, in particular, at which there is no thermally induced degradation.

The device according to the invention thus makes it possible to provide optimum treatment, in particular devolatilization and, in some cases, also reaction, whether in combination with devolatilization or independently thereof, of materials with a viscosity of up to 15,000 Pas. More specifically, the device according to the invention is suitable for the treatment of very high-viscosity polymers, with which there is a need, after the polymerization reaction, to separate out solvents still contained in the polymer and/or excess monomers or oligomers with a relatively high boiling point or those formed unintentionally during a reaction.

The device according to the invention is especially advantageous for the treatment of polymers based on renewable raw materials since these are generally relatively temperature-sensitive. The device according to the invention is also especially advantageous for the treatment of polymers and high-viscosity materials which should have a particularly high level of devolatilization for applications in the sectors of medicine, cosmetics and food technology. As mentioned, the device is particularly well-suited precisely for treating relatively temperature-sensitive materials because the heat energy to which the material is exposed can be set in an optimum manner by virtue of the possibility of selecting a relatively low temperature and short dwell time on the treatment surface.

Typically, the viscosity of the material to be treated with the device according to the invention is in a range of from 100 to 15,000 Pas, in particular from 1000 Pas to 10,000 Pas and, more specifically, from 1500 Pas to 6000 Pas. Here, the viscosity values are based on the operating temperature and a shear gradient of $D=10 \text{ sec}^{-1}$.

As regards the operating temperature of the device according to the invention, this is generally in a range of from 40 to 400° C., in particular from 150 to 350° C. and, more specifically from 20 to 300° C.

The features according to the claim, namely that, "at least in a longitudinal section of the rotor", some of the spreading elements are configured as transport elements and some as distributing elements means that the invention includes embodiments in which this design of the spreading elements is implemented over the entire length of the rotor as well as embodiments in which this is implemented only over part of the rotor length, in particular only in a central longitudinal section.

As mentioned, the distributing elements comprise teeth which project from the hollow shaft. It is conceivable here that the teeth project in an at least approximately radial direction from the hollow shaft or, alternatively, project at an angle to the radial direction. In general, the teeth are each fixed on one of several axially extending flanges arranged on the hollow shaft.

According to a preferred embodiment, the shearing edge of at least some of the teeth encloses an angle in a range of from 0 to 40° relative to the axial direction.

Depending on the respective application, there may be a particular preference for said angle to be in a range of from 10 to 30°, and more specifically of about 20°. According to this embodiment, the distributing elements thus also impart to the material to be treated a transporting component in a direction toward the material outlet, wherein this transporting component is smaller than that of the transport elements. It is conceivable for this embodiment, for instance, for the teeth to have a proximal subsection which lies in a plane extending parallel to the axial direction and via which the teeth are flanged on, and a distal subsection, which lies in a plane extending obliquely to the axial direction and the radially outer end of which forms the shearing edge.

Depending on the application, there may be a preference, as an alternative to this embodiment, for the shearing edge of at least some of the distributing elements to enclose an angle smaller than the abovementioned angle and, in particular, to extend at least approximately parallel to the axial direction, that is to say to enclose an angle of about 0° relative to said direction. In the last-mentioned case, the distributing elements are completely neutral in terms of transport and have an exclusively distributing function. The specific configuration of the distributing elements which is chosen ultimately depends on the material to be treated and can vary within the definition according to the invention.

As regards the transporting elements, these comprise at least one transporting rib, the radial outer edge of which generally encloses an angle greater than 45° relative to the axial direction. Thus, even with a very high-viscosity material, the transporting component imparted by the transport element is sufficiently high to obtain a desired transport rate through the treatment chamber.

The radial outer edge of the transporting rib preferably encloses an angle of at most 65° relative to the axial direction. More specifically, the angle lies in a range of from 50° to 60°.

Apart from the fact that the transport effect of a transport element is determined by the angle of incidence of the radial outer edge of a transporting rib, the transporting effect of the transport element can additionally be set by means of the number of transporting ribs or the spacing between the transporting ribs that follow one another in the axial direction.

According to a particularly preferred embodiment, the transport elements each comprise an angular web plate, which is arranged at least approximately parallel to the axial direction and on the outer side of which at least one helically extending transporting rib is arranged. By virtue of the angular shape, the web plate is thus divided into a first and a second web plate surface, which lie in planes extending obliquely to one another.

Apart from the outer edge of the transporting rib, the angular shape of the web plate in this embodiment results in a shearing edge which generally extends axially and which is set back relative to the radial outer edge of the transporting rib and is thus arranged at a greater distance from the treatment surface than said edge. Thus, according to this embodiment, the transport element also contributes to optimum distribution of the material on the treatment surface.

According to another preferred embodiment, the distributing elements are arranged alternately with the transport elements in the circumferential direction of the rotor since very uniform distribution of the material on the treatment surface can thereby be ensured.

Moreover, there may be a preference to design the spreading elements of the rotor exclusively as transport elements in the region of the material inlet in order to achieve a high delivery rate particularly in this region and thus counteract an accumulation of material.

There is typically a pressure in the range of from 0.1 to 0.5 Pa in the treatment chamber during the operation of the device in order to achieve as high as possible a devolatilization rate, even at moderate temperatures.

In the case of such a low operating pressure or such a high vacuum, a pre-devolatilization stage is preferably provided, which separates out a large proportion of the volatile constituents of the material to be treated before the material is introduced into the treatment chamber. In this way, the gas volume flow is kept within a manageable range. Immediately before being introduced, the material to be treated is preferably in equilibrium with the gas phase.

It is, of course, also possible, depending on the application, for the operating pressure of the device to be higher if this makes it possible to ensure good treatment, in particular sufficient devolatilization.

By virtue of the fact that the material is exposed to a sharp pressure reduction upon introduction into the treatment chamber, gaseous components can nevertheless escape instantaneously from the material (in the course of "flash" evaporation), which can lead, in turn, to entrainment of material. According to a preferred embodiment, in order to avoid entrained material reaching the hollow shaft and ultimately entering the condensation space and being able to contaminate the condensate, the device has a splash guard completely surrounding the hollow shaft in the region of the material inlet.

According to a very simple and therefore preferred embodiment, the splash guard is in this case formed by the transport elements and by plates, each of said plates connecting two circumferentially successive transport elements. For the abovementioned embodiment in which the transport elements each comprise an angular web plate having at least one helically extending transporting rib on the outside, it is thus possible for a first top surface side of a first transport element to be connected to the second top surface side of a second transport element preceding the first transport element in the direction of rotation, as explained further in conjunction with the figures.

According to another preferred embodiment, in order to prevent an accumulation of material in the region of the material outlet too, the spreading elements of the rotor are designed exclusively as transport elements in this region too.

The number of spreading elements distributed in the circumferential direction is generally between 4 and 80, preferably between 6 and 48, and most preferably between 8 and 32. Very good transport and distribution of the material during the treatment thereof on the treatment surface can thereby be achieved. Here, the optimum number of spreading elements depends on the respective application and on the size or diameter of the rotor.

As is likewise explained in the context of the figures, according to a particularly preferred embodiment, the rotor has, between the inlet region and the outlet region, in which all the spreading elements are configured as transport elements, a central region, across which transport elements extend as an axial extension of some of the transport elements of the inlet region. In the central region, these each alternate with a distributing element, which is in each case likewise arranged as an axial extension of a transport element of the inlet region.

As mentioned, according to the invention, the condenser is arranged in a condensation space, which is surrounded by the hollow shaft.

According to a particularly preferred embodiment, the condenser comprises an inner tube and an outer tube concentrically surrounding the inner tube. Both the outer tube and the inner tube have an outer wall and an inner wall, which are spaced apart from one another, at least in some region or regions, and in this way form an inner-tube cooling-medium circulation duct in the inner tube and an outer-tube cooling-medium circulation duct in the outer tube. In this case, the inner-tube cooling-medium circulation duct and the outer-tube cooling-medium circulation duct are fluidically connected to one another. Here, the condenser is generally configured in such a way that a cooling-medium feed line opens into one of the two cooling-medium circulation ducts, that is to say, for example, into the outer-tube cooling-medium circulation duct, and a cooling-medium outlet leads away from the other cooling-medium circulation duct in each case, that is to say, in the example mentioned, from the inner-tube cooling-medium circulation duct. Typically, the cooling-medium feed line and the cooling-medium outlet are arranged in a lower region of the condenser, and the connection between the cooling-medium circulation ducts is arranged in an upper region. During operation, the cooling medium thus flows upward from a lower region of one outer/inner tube, crosses into the respective other tube in an upper region and, from there, flows downward in the inner or outer tube.

It is furthermore conceivable that the inner tube and the outer tube are both formed by a plate in which the inner wall is spot-welded to the outer wall, wherein the hollow buffer resulting between the inner wall and the outer wall serves as a cooling-medium circulation duct. In this case, welding circuits can be provided for the welded joint while, on the respective upper and lower ends of the plate, the hollow buffer is generally closed off by circumferential seams. This allows a very light and compact but nevertheless very stable configuration of the condenser.

Windows are furthermore generally arranged in the outer tube, these being intended to ensure that the gaseous components for condensation can also reach the inner tube. In this case, the windows are preferably arranged uniformly in the longitudinal and in the circumferential direction.

In comparison with the devices that are likewise encompassed by the invention, in which the condenser is designed as a shell-and-tube condenser, improved static properties are obtained in the case of the abovementioned particularly preferred embodiment of the condenser, this being particularly advantageous precisely in respect of an increased L/D ratio of the device according to the invention, which is designed for the treatment of very high-viscosity materials, as compared with conventional devices.

A shell-and-tube condenser may be preferred in the case of very large devices, for example, although the use of a shell-and-tube condenser is not excluded, even for relatively small devices. The tubes of the shell-and-tube condenser are preferably arranged in two concentric rows offset relative to one another in such a way as to leave no visible gaps.

According to another preferred embodiment of the device according to the invention, the housing has a vacuum connection, which is configured in such a way as to apply a vacuum directly to the condensation space, i.e. to the interior of the hollow shaft. It is particularly preferred here if the vacuum connection opens into an upper part of the housing, which is fluidically connected to the condensation space and is sealed off from the treatment chamber, wherein a rotating labyrinth seal, in particular, can be provided for sealing.

Particularly in connection with the abovementioned embodiment, according to which there is a splash guard completely surrounding the hollow shaft in the region of the material inlet, it is thus possible to ensure that the material is guided as a co-current flow in this region and that only gaseous components that have passed through the condensation space and thus cannot be condensed under the existing conditions (i.e. are volatile components) are removed. Ultimately, this results in a high condensation rate of the lower-boiling components of the treated material.

The rotor is generally cantilever-mounted. According to a preferred embodiment, it has at least two bearing shoes arranged symmetrically with respect to the axis in its end region on the material outlet side, i.e. its lower end region, and is guided radially by a bearing ring of the housing, which forms a material-lubricated bearing together with the bearing shoes.

Here, the bearing shoes are preferably configured in such a way as to push material into the radial gap between the bearing ring and the bearing shoe during the rotation of the rotor. It is furthermore preferred that transporting elements, in particular transporting elements in accordance with the above description comprising an angular web plate having at least one helically extending transporting rib on the outside thereof, are additionally arranged between the bearing shoes. This ensures that material transfer through the radial rotor guide or the bearing can be at least approximately maintained.

The radial guide in the lower region of the rotor makes possible devices with a very high L/D ratio as compared with conventional short-path evaporators, this being particularly advantageous precisely in view of the fact that the device according to the invention is designed for the treatment of very high-viscosity materials.

In general, the material inlet of the device according to the invention is in the form of a connection aligned tangentially with respect to the housing; this is in contrast with previously known short-path evaporators, such as that according to EP 2 039 409, in which the material is fed in from above, that is to say through the cover closing off the treatment chamber at the top.

As regards the material outlet, this is preferably in the form of a discharge device which adjoins the treatment chamber in the axial direction, i.e. is arranged centrally. This can be in the form of a hopper with a conical inlet container and a level-controlled pump. Thus, the device according to the invention is further distinguished from previously known short-path evaporators, such as that shown in EP 2 039 409, in which the material is discharged laterally from the treatment chamber, generally via a water trap.

According to a special embodiment, a discharge aid which is attached and driven from below, in particular a feed screw, which feeds the product to a laterally arranged pump, can be provided. According to another special embodiment, it is conceivable for the discharge aid to directly adjoin the bearing described and to feed the treated material at the same speed as the rotor to a discharge pump arranged at the bottom.

In this way, a relatively high discharge rate is ensured and an accumulation ahead of the material outlet is minimized or prevented, even in the case of a very high viscosity of the fully treated material to be discharged.

In order nevertheless to ensure that any accumulating material does not reach the condenser and can block the condensate outlet, the device according to another preferred embodiment has a static cover plate concentrically surrounding the condenser. In this way, material which is forced upward in the event of insufficient material discharge is kept away from the condenser by the cover plate. For this purpose, it may be preferred if the cover plate tapers conically upward. However, a cylindrical cover plate is also conceivable.

Particularly as regards the embodiment in which the cover plate is of cylindrical design, it is furthermore preferred if the rotor has, on the inside thereof, at the level of the cover plate, a bush designed as a counterpart to the cover plate and having a transport spiral formed on the inside thereof. This bush thus rotates with the rotor. The transport spiral has a downward transportation direction, that is to say toward the material outlet. In this case, the gap between the bush and the cover plate is smaller than the gap formed further up between the rotor and the condenser, with the result that the transport spiral extends at a relatively short distance from the cover plate and, as a result, ultimately very effective downward material transport and good sealing of the condensate outlet can be ensured.

Apart from the device described above, the present invention relates, according to another aspect, to a device for the thermal treatment of viscous material, in particular for the thermal separation of material components contained in viscous material, comprising a housing having a heatable housing jacket, which surrounds a treatment chamber and forms a rotationally symmetrical treatment surface extending in the axial direction, a material inlet, which is arranged in an inlet region of the housing, for introducing the material to be treated into the treatment chamber, a material outlet, which is arranged in an outlet region of the housing, for discharging the material out of the treatment chamber, and a drivable rotor, which is arranged in the treatment chamber and extends coaxially, for producing a material film on the treatment surface, wherein the rotor comprises a hollow shaft, arranged in a manner distributed over the circumference of which are spreading elements, the radially outer end of which is spaced apart from the treatment surface, wherein the hollow shaft surrounds a condensation space, in which a condenser is arranged, and has through openings, through which gaseous material components escaping from the material during the thermal treatment can enter the condensation space, wherein the condenser comprises an inner tube and an outer tube concentrically surrounding the inner tube, which each have an outer wall and an inner wall, which are spaced apart from one another, at least in some region or regions, and in this way form an inner-tube cooling-medium circulation duct in the inner tube and an outer-tube cooling-medium circulation duct in the outer tube, and the inner-tube cooling-medium circulation duct and the outer-tube cooling-medium circulation duct are fluidically connected to one another.

This aspect of the invention enables a device to be made available which has improved static properties in comparison with devices in which the condenser is designed as a shell-and-tube condenser. In particular, devices with an increased L/D ratio as compared with conventional devices are made possible, allowing optimum treatment of the material precisely in respect of the use of the device to treat very high-viscosity materials.

According to another aspect, the present invention furthermore relates to a device for the thermal treatment of viscous material, in particular for the thermal separation of material components contained in viscous material, comprising a housing having a heatable housing jacket, which surrounds a treatment chamber and forms a rotationally symmetrical treatment surface extending in the axial direction, a material inlet, which is arranged in an inlet region of the housing, for introducing the material to be treated into the treatment chamber, a material outlet, which is arranged in an outlet region of the housing, for discharging the material out of the treatment chamber, and a drivable rotor, which is arranged in the treatment chamber and extends coaxially, for producing a material film on the treatment surface, wherein the rotor comprises a hollow shaft, arranged in a manner distributed over the circumference of which are spreading elements, the radially outer end of which is spaced apart from the treatment surface, wherein the hollow shaft surrounds a condensation space, in which a condenser is arranged, and has through openings, through which gaseous material components escaping from the material during the thermal treatment can enter the condensation space, wherein the device has a splash guard completely surrounding the hollow shaft in the region of the material inlet.

As explained above, this avoids a situation where material which is entrained by flash evaporation during introduction into the treatment chamber can reach the hollow shaft and ultimately enter the condensation space and contaminate the condensate.

According to another aspect, the invention relates to a device for the thermal treatment of viscous material, in particular for the thermal separation of material components contained in viscous material, comprising a housing having a heatable housing jacket, which surrounds a treatment chamber and forms a rotationally symmetrical treatment surface extending in the axial direction, a material inlet, which is arranged in an inlet region of the housing, for introducing the material to be treated into the treatment chamber, a material outlet, which is arranged in an outlet region of the housing, for discharging the material out of the treatment chamber, and a drivable rotor, which is arranged in the treatment chamber and extends coaxially, for producing a material film on the treatment surface, wherein the rotor comprises a hollow shaft, arranged in a manner distributed over the circumference of which are spreading elements, the radially outer end of which is spaced apart from the treatment surface, wherein the hollow shaft surrounds a condensation space, in which a condenser is arranged, and has through openings, through which gaseous material components escaping from the material during the thermal treatment can enter the condensation space, and at least some of the spreading elements are configured as transport elements, which impart a transporting component to the material in the direction from the material inlet to the material outlet, wherein the housing has a vacuum connection, which is configured in such a way as to apply a vacuum directly to the condensation space, that is to say to the interior of the hollow shaft, in particular in that the vacuum connection opens into an upper part of the housing, which is fluidically connected to the condensation space and is sealed off from the treatment chamber.

In this way, it is possible to make available a device by means of which only gaseous components that have passed through the condensation space are removed, resulting ultimately in a high condensation rate of the lower-boiling components of the treated material.

For all of the additional aspects of the invention described, those features referred to as preferred for the first aspect likewise count as preferred.

The invention is further explained by means of the attached figures,
of which:

Figure 1:
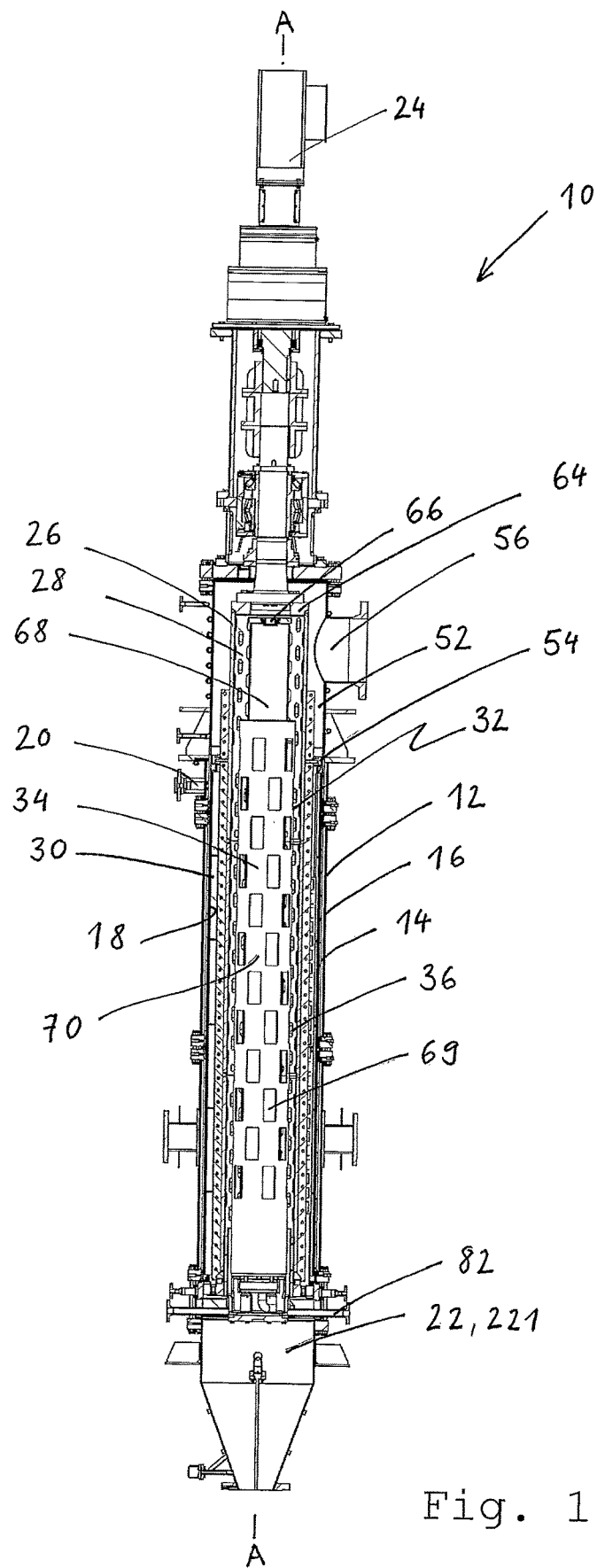
FIG. 1 shows a device according to the present invention, wherein, for the sake of clarity, the housing jacket and the hollow shaft have been removed from the illustration to an extent sufficient to open up the view of the condenser.

As shown in FIG. 1, the device 10 according to the invention comprises a vertically aligned housing 12 having a heatable housing jacket 14, which surrounds a treatment chamber 16 and, on the inside thereof, forms a rotationally symmetrical treatment surface 18 extending in the axial direction A.

The device furthermore comprises a material inlet 20, which passes through the housing jacket 14, for introducing the material to be treated into the treatment chamber 16, and a material outlet 22. The material inlet 20, which is aligned tangentially with respect to the housing jacket, is furthermore shown in FIG. 4, for example.

Arranged in the treatment chamber 16 is a co-axially extending rotor 26, which can be driven by means of a drive unit 24. Said rotor comprises a hollow shaft 28 and spreading elements 30, which project from the hollow shaft 28 and are arranged in a manner distributed over the circumference thereof. In this case, the radially outermost end of the spreading elements 30 is spaced apart from the treatment surface 18 in order to spread the material out into a thin material film on the treatment surface 18 during operation, i.e. during the rotation of the rotor 26.

The hollow shaft 28 surrounds a condensation space 32, in which a static condenser 34 is arranged, and has through openings 36, through which gaseous material components escaping from the material during the thermal treatment enter the condensation space 32 to enable them to condense there on the condenser 34.

Figure 2:
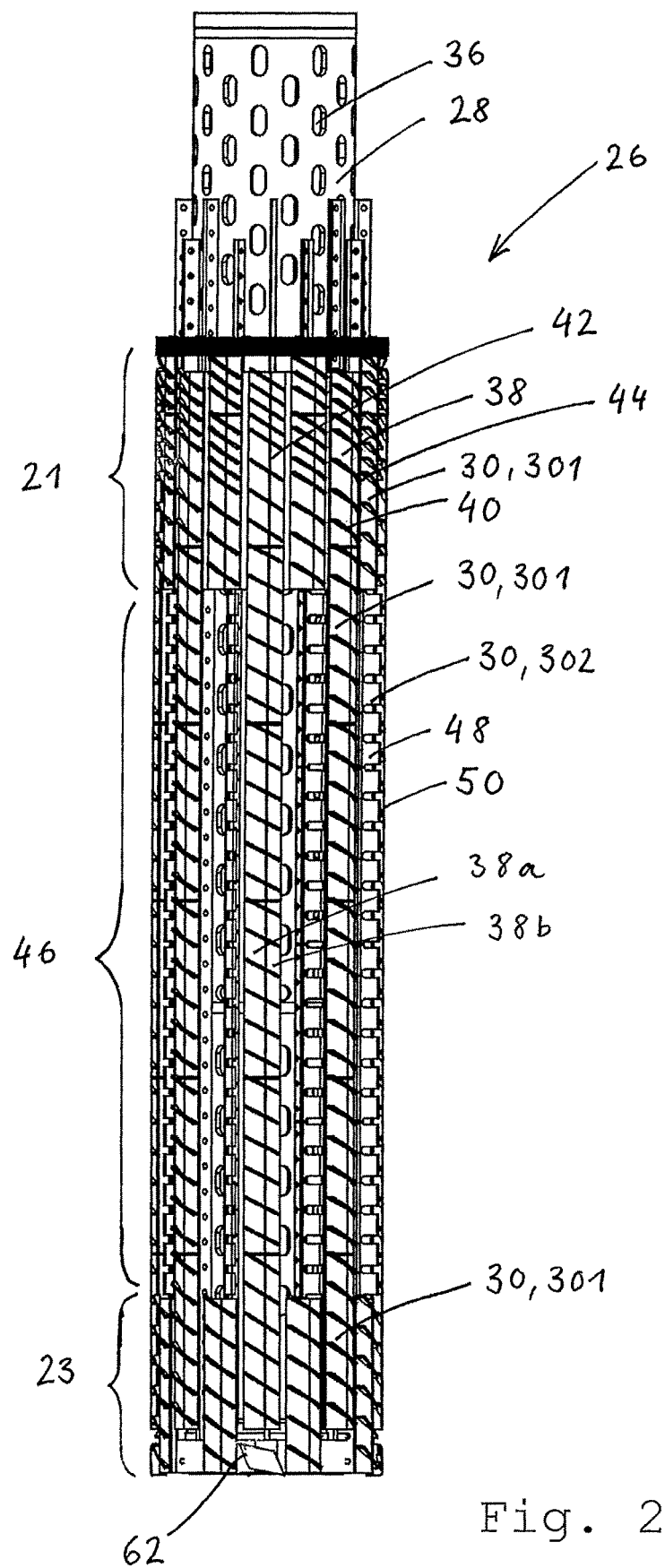
FIG. 2 shows a view of the rotor of the device shown in FIG. 1.
Figure 3:
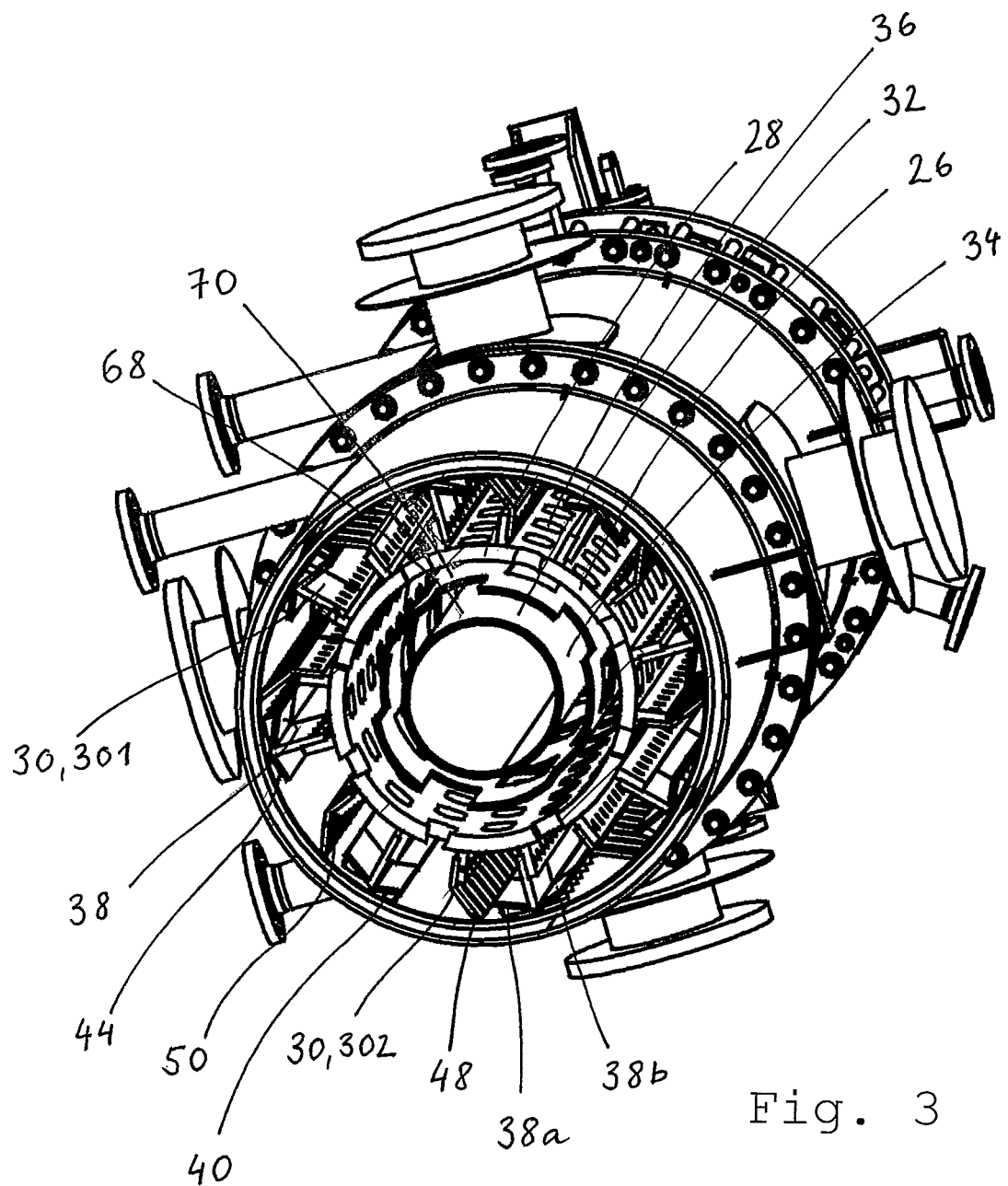
FIG. 3 shows a perspective view of a device according to the present invention sectioned transversely to the axial direction above the material inlet.
Figure 4:
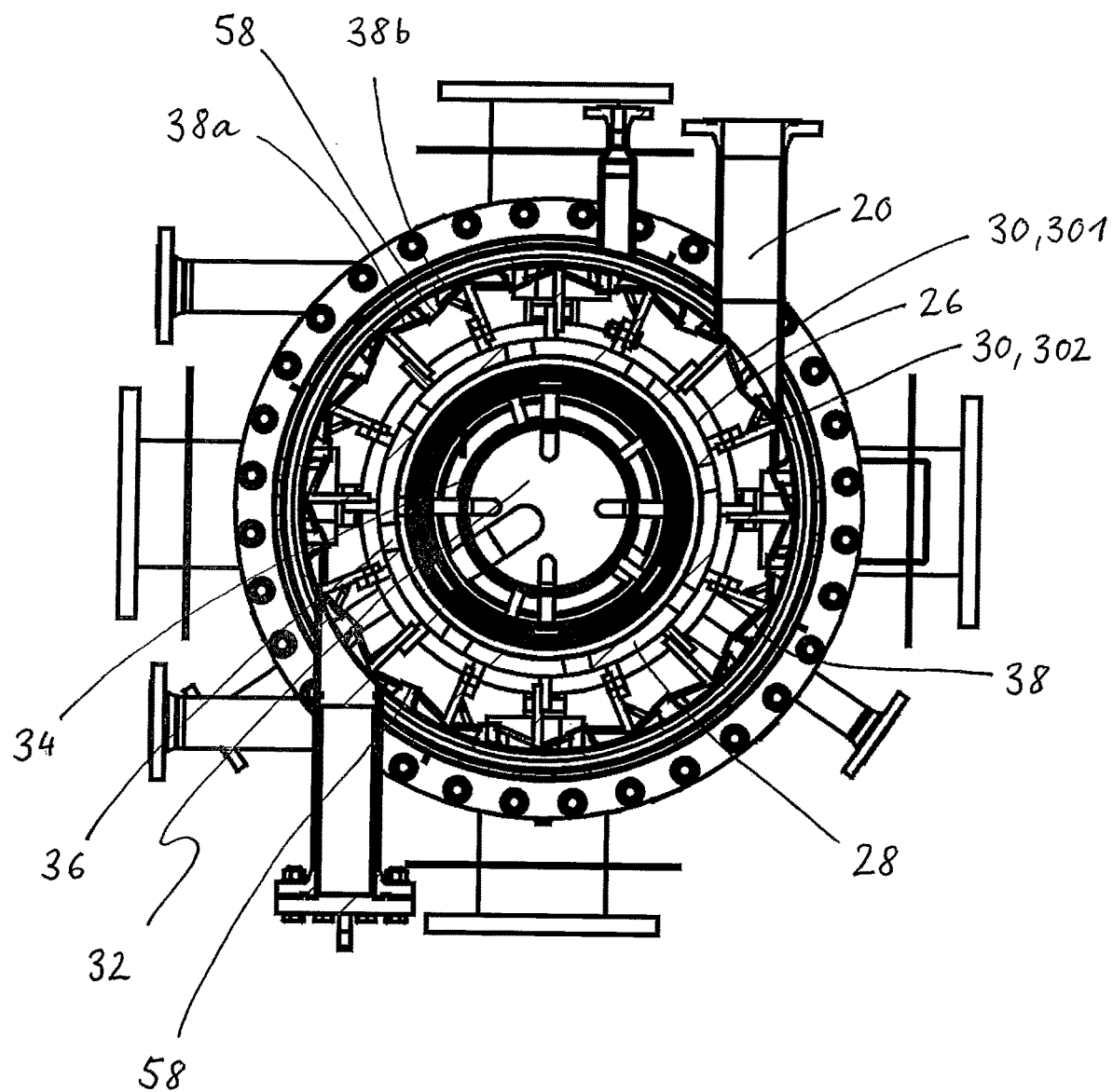
FIG. 4 shows a cross section through the device shown in FIG. 3 at the level of the material inlet.

In the rotor 26 shown in FIGS. 2 to 4, the spreading elements are arranged in a manner distributed over the circumference of the hollow shaft 28 in a total of 16 rows extending parallel to the axial direction.

In an inlet region 21, i.e. in a region of the rotor 26 at the level of the material inlet 20, and in an outlet region 23, all the spreading elements 30 are configured as transport elements 301, which impart a transporting component to the material in the direction from the material inlet 20 to the material outlet 22. More specifically, the transport elements 301 comprise an angular web plate 38, on the outer side of which helically extending transporting ribs 40 are arranged.

In the embodiment shown, the outer edge of these transporting ribs 40 encloses an angle of about 60° relative to the axis of the rotor.

Figure 5:
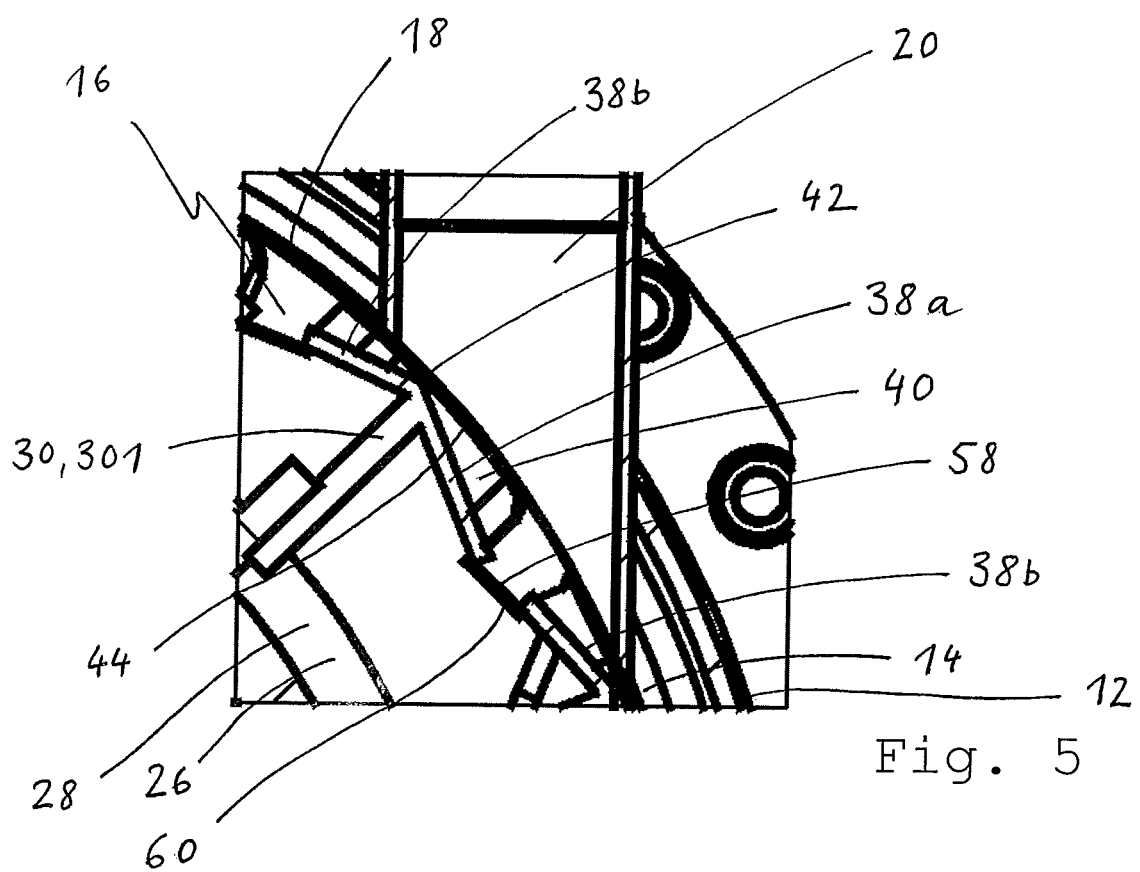
FIG. 5 shows a detail view of the transport elements shown in FIG. 4.
Figure 6:
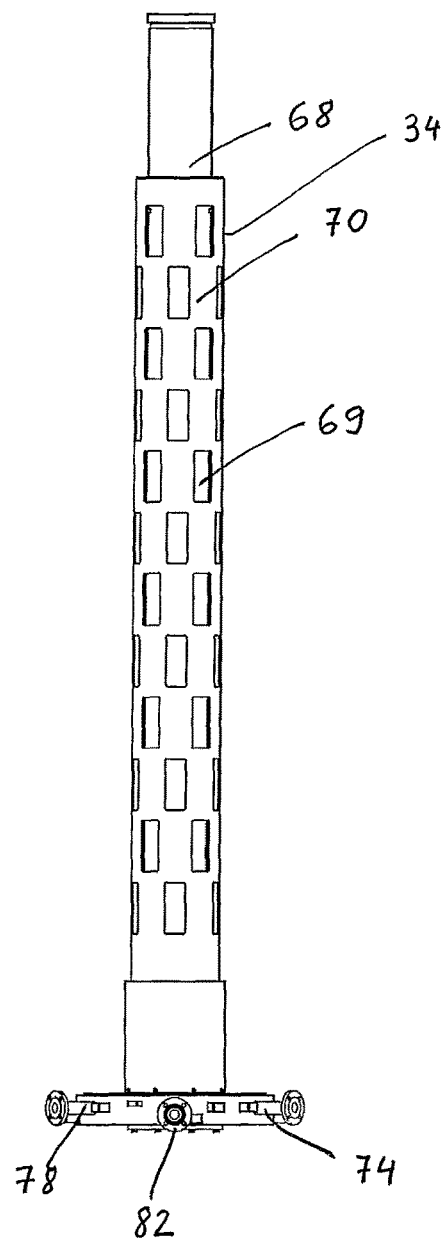
FIG. 6 shows a view of the condenser of the device shown in FIG. 1.

Moreover, the tip of the top surface of the web plate 38 forms an axially extending shearing edge 42, which is set back relative to the radial outer edge 44 of the transporting rib 40 and is thus arranged at a greater distance from the treatment surface 18 than said edge, as shown especially in FIG. 5. More specifically, the tip of the top surface of the web plate 38 or shearing edge 42 of the transport element 301 in the embodiment shown is at a distance of about 5 mm from the treatment surface 18, while the distance between the radial outer edge 44 of the transporting rib 40 and the treatment surface is only about 3 mm.

A central region 46 is arranged between the inlet region 21 and the outlet region 23, in which all the spreading elements 30 are configured as transport elements 301. In this central region, only half of the spreading elements distributed in the circumferential direction, that is to say, in the specific case, 8 spreading elements, are designed as transport elements 301 forming an axial extension of the respective transport element of the inlet region 21. These each alternate with a distributing element 302, which is in each case likewise arranged as an axial extension of a transport element 301 of the inlet region 21.

The distributing elements 302 project radially from the hollow shaft and, in the embodiment shown, comprise a multiplicity of teeth 48 arranged axially in succession. In this case, the radially outermost end of the teeth 48 in each case forms a shearing edge 50, which extends parallel to the axis A of the rotor 26. Thus, the distributing element 302 primarily has a distributing function with a negligible or nonexistent transport function, whereas the transport element 301 following on in the circumferential direction primarily has a transporting function and secondarily—by virtue of the shearing edge 42 of the web plate—a distributing function. In this case, the shearing edge 50 of the teeth, which is neutral in terms of transport by virtue of the axial alignment, is arranged at a shorter distance from the treatment surface 18 than is the case for the shearing edge 42 of the web plate of the transport elements, as has already been mentioned and as is shown especially in FIG. 5. By virtue of the resulting narrower gap for the spreading of the material, the distributing elements 302 thus have a greater shearing action than the transport elements 301.

Apart from the treatment chamber 16, the housing 12 has an upper part 52, which is arranged there above and sealed off relative to the treatment chamber and into which the rotor 26 and the condenser 34 project. More specifically, a rotating labyrinth seal 54, for instance, is conceivable for sealing between the treatment chamber 16 and the upper part 52.

A vacuum connection 56 opens into the upper part 52 of the housing 12. Thus, in this embodiment, the vacuum is applied directly to the condensation space 32, which is fluidically connected to the vacuum connection 56, but not to the treatment chamber 16, which is sealed off relative to the upper part 52. Thus, all the gaseous components removed via the vacuum connection 56 pass through the condensation space 32, leading to a very high yield of lower-boiling material components to be condensed.

Moreover, respective pairs of circumferentially successive transport elements 301 are connected by a connecting plate 58 in the inlet region 21, as shown especially in FIGS. 4 and 5. More specifically, a first side 38a of the top surface of the web plate of a first transport element is connected to the second side 38b of the top surface of the web plate of a second transport element moving ahead of the first transport element in the direction of rotation.

A splash guard 60 that completely surrounds the hollow shaft 28 is thereby formed, said splash guard preventing material which is subject to "flash evaporation" during introduction into the treatment chamber and is entrained by the gaseous material components escaping instantaneously from the material from reaching the hollow shaft 28 or entering the condensation space 32 and ultimately contaminating the condensate.

In the region in which a splash guard 60 is formed, the material and the gaseous material components escaping during treatment are thus guided in a co-current flow while, in the central region 46 adjoining this in the delivery direction and in the outlet region 23, the material and the gaseous material components are guided in a countercurrent flow. Thus, after a first region in the delivery direction, in which allowance is made for entry to the high vacuum or for the "flash evaporation" resulting therefrom, optimum degasification is achieved in a second region since contact between the material to be treated and the enriched vapors is minimized.

The rotor 26 of the embodiment shown is cantilever-mounted and is guided radially in the outlet region 23 by a bearing ring (not shown), which forms a material-lubricated bearing together with bearing shoes 62 (shown in FIG. 2) arranged on the hollow shaft 28. For this purpose, the bearing shoes are configured in such a way as to push material into the radial gap between the bearing ring and the bearing shoe during the rotation of the rotor 26.

As mentioned, the condenser 34 is arranged in a condensation space 32, which is surrounded by the hollow shaft 28 and which is connected to the treatment chamber 16 via through openings 36 for the purpose of allowing through the gaseous material components escaping from the material during the thermal treatment and ultimately of condensing the less volatile substances contained in said material components.

The stationary condenser 34 is stabilized by means of a centrally arranged pin 66, which is held in a plate 64 closing off the hollow shaft 28 at the top. In the specifically shown embodiment, the pin is fixed at the upper end of the condenser inner tube, which projects from the outer tube.

More specifically, the condenser 34 comprises an inner tube 68 and an outer tube 70 concentrically surrounding the inner tube, wherein the inner tube 68 projects vertically beyond the outer tube 70 and has the pin 66 mentioned at its upper end. Both the inner tube 68 and the outer tube 70 have an outer wall 681 and 701, respectively, and an inner wall 682 and 702, respectively, which are spaced apart from one another in some region or regions and in this way form a gap for the circulation of a cooling medium. Thus, an inner-tube cooling-medium circulation duct 683 is formed in the inner tube 68, and an outer-tube cooling-medium circulation duct 703 is formed in the outer tube 70, wherein these are fluidically connected to one another.

Windows 69 are furthermore arranged in the outer tube, these being uniformly distributed in the longitudinal and in the circumferential direction and ensuring that the gaseous components for condensation can also reach the inner tube 68.

Figure 8:
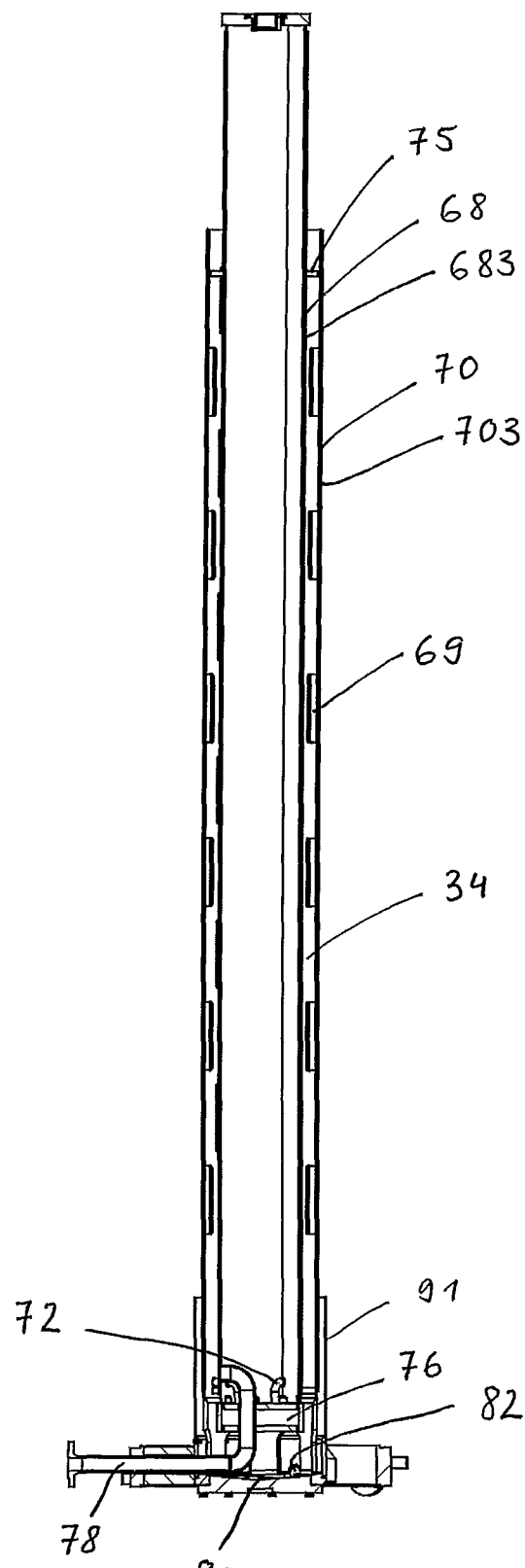
FIG. 8 shows the condenser shown in FIG. 6 in longitudinal section along the section planes shown in FIG. 7.
Figure 9:
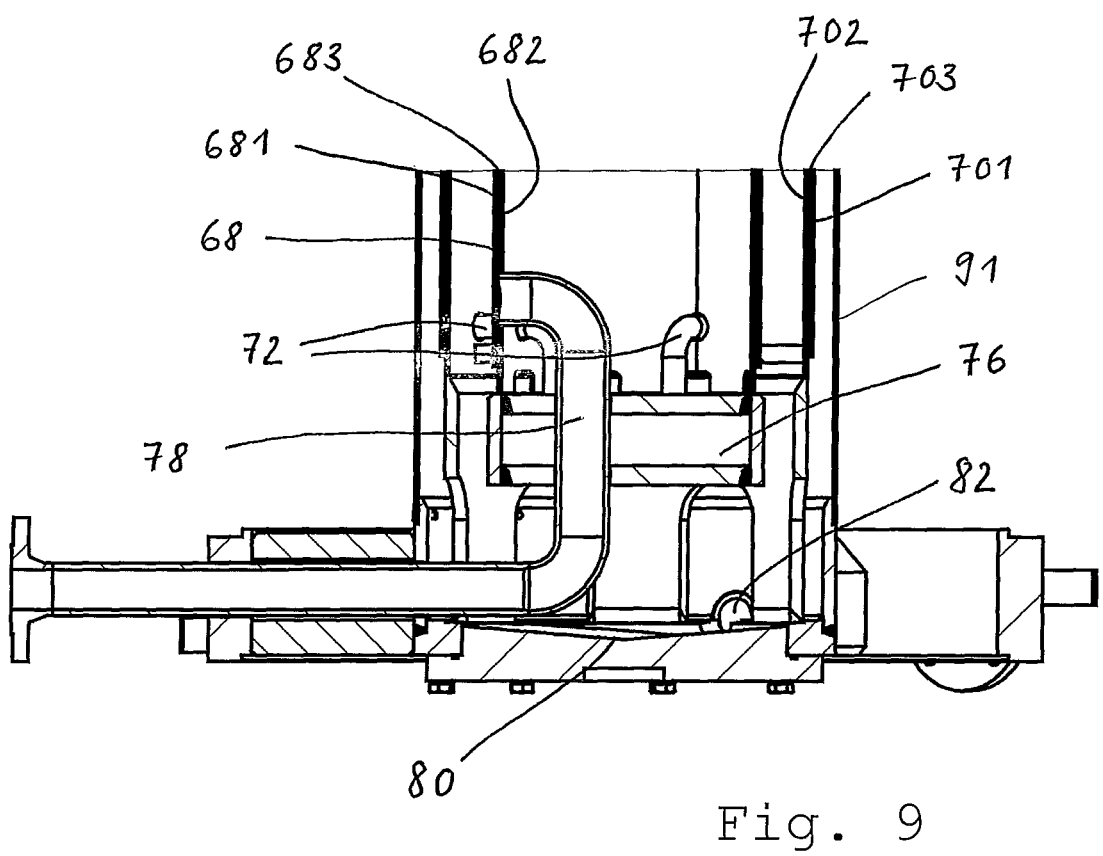
FIG. 9 shows an enlarged longitudinal section of the lowermost part of the condenser shown in FIG. 6.

In the specifically shown embodiment or the detail illustration according to FIG. 9, cooling-medium feed lines 72 from a cooling-medium reservoir 76 supplied via a cooling-medium feed 74 into the outer-tube cooling-medium circulation duct 703 open in the outlet region. From there, the cooling medium flows upward, crosses into the inner-tube cooling-medium circulation duct 683 via a connecting duct 75 shown in FIG. 8 and flows downward in said circulation duct, before it is carried out of the inner-tube cooling-medium circulation duct 683 via a cooling-medium outlet 78. In this case, the cooling-medium feed 74 and the cooling-medium outlet 78 lead away from the housing and are spaced apart from one another by about 120°, as shown for instance in FIG. 7 in combination with FIG. 8. During the circulation of the cooling medium, thermal energy is transferred from the gaseous material components to the cooling medium via the condenser surface, ultimately leading to the condensation of the less volatile substances on the condenser surface.

Figure 7:
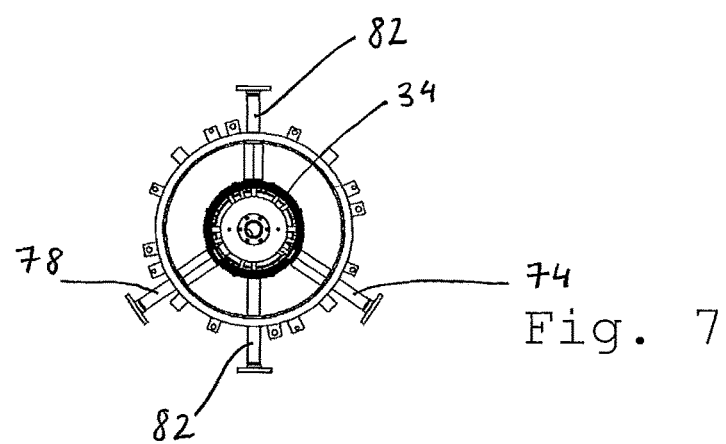
FIG. 7 shows the condenser shown in FIG. 6 in cross section.

The condensate formed during this process flows downward on the condenser surface and ultimately onto the condenser bottom 80, which is in the form of a sink or trough, from where it is discharged via corresponding condensate outlets 82 leading away from the lowermost point of the condenser bottom. More specifically, in the embodiment shown, the condensate outlets leading radially away from the housing are spaced apart by 180°, as shown in FIG. 7, for instance.

In order to remove the devolatilized viscous material, present after treatment, from the housing, the material outlet 22 is configured in the form of a discharge device 221 adjoining the treatment chamber and flanged thereto.

As is apparent from FIGS. 8 and 9, the device furthermore has a static cover plate 91, which surrounds the condenser 34 concentrically and which is cylindrical in the embodiment shown. Thus, material which is pushed upward when there is insufficient material discharge is kept away from the condenser 34 by the cover plate 91, thereby ultimately also making it possible to prevent blocking of the condensate outlet 82.

Figure 10:
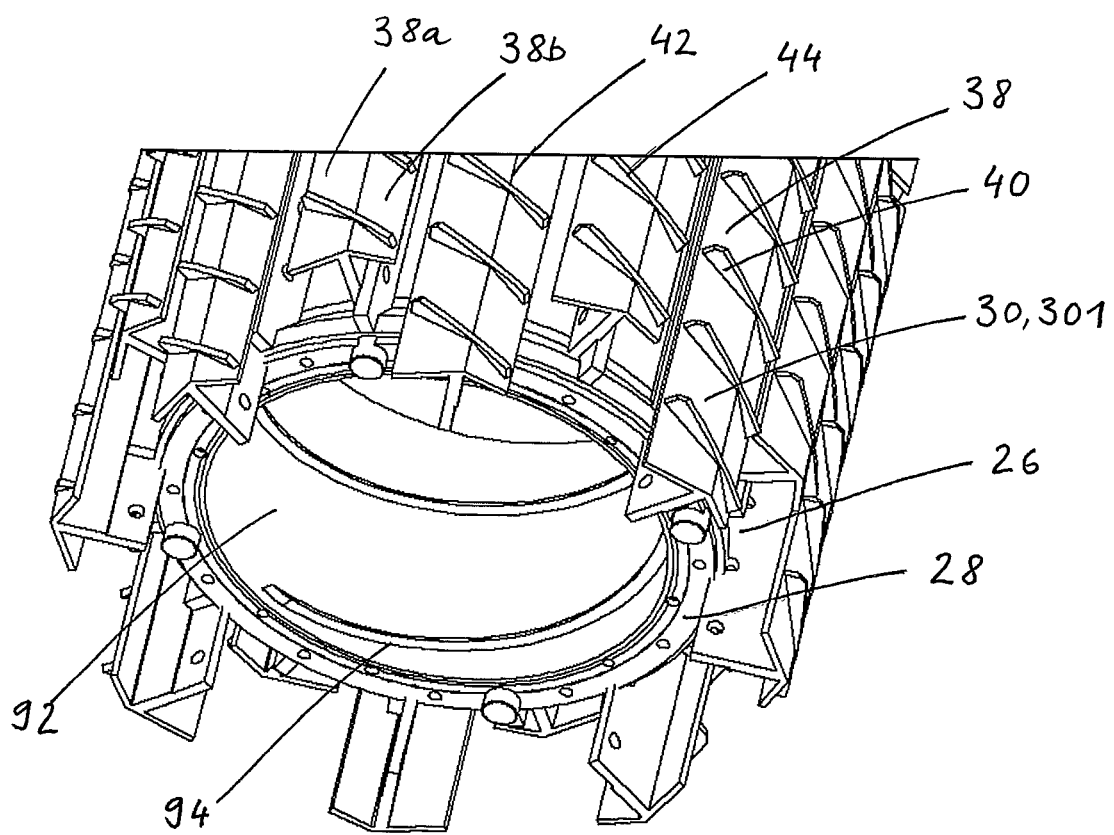
FIG. 10 shows a perspective view of the rotor end region on the material outlet side.

As shown in FIG. 10, the rotor 26 has a bush 92 on the inside thereof with a transporting spiral 94 having a downward transport direction. This bush 92 is arranged at the level of the rotor 26 which corresponds to the level of the cover plate 91 shown in FIGS. 8 and 9 and is designed as a counterpart to the cover plate. Here, the gap between the bush 92 and the cover plate 91 is smaller than the gap, formed further up, between the rotor 26 and the condenser 34. During the operation of the device, very effective downward transport of material and hence good sealing of the condensate outlet 82 is ensured by the bush 92 or the delivery spiral 94, which rotates with the rotor.

LIST OF REFERENCE SIGNS 10 device
12 housing
14 housing jacket
16 treatment chamber
18 treatment surface
20 material inlet
21 inlet region
22 material outlet
221 discharge hopper
23 outlet region
24 drive unit
26 rotor
28 hollow shaft
30 spreading elements
301 transport element
302 distributing element
32 condensation space
34 condenser
36 through openings
38 angular web plate
38a, b sides of the top surface of the web plate
40 transporting rib
42 shearing edge of the web plate
44 radial outer edge of the transporting rib
46 central region
48 tooth of the distributing element
50 shearing edge of the teeth
52 upper part
54 labyrinth seal
56 vacuum connection
58 (connecting) plate
60 splash guard
62 bearing shoe
64 plate (upper end of the hollow shaft)
66 pin
68 inner tube
681 outer wall of the inner tube
682 inner wall of the inner tube
683 inner-tube cooling-medium circulation duct
69 window
70 outer tube
701 outer wall of the outer tube
702 inner wall of the outer tube
703 outer-tube cooling-medium circulation duct
72 cooling-medium feed line
74 cooling-medium feed
76 cooling-medium reservoir
78 cooling-medium outlet
80 condenser bottom
82 condenser outlet
91 cover plate
92 bush
94 transporting spiral
A axial direction

The invention claimed is:

1. A device for the thermal treatment of viscous material, in particular for the thermal separation of material components contained in viscous material, comprising:
    a housing having a heatable housing jacket, which surrounds a treatment chamber and forms a rotationally symmetrical treatment surface extending in an axial direction,
    a material inlet, which is arranged in an inlet region, of the housing, for introducing the material to be treated into the treatment chamber,
    a material outlet, which is arranged in an outlet region, of the housing, for discharging the material out of the treatment chamber, and
    a drivable rotor, which is arranged in the treatment chamber and extends coaxially, for producing a material film on the treatment surface,
    wherein the rotor comprises a hollow shaft, spreading elements are distributed over the circumference of the hollow shaft, and the radial outer ends of the spreading elements are spaced apart from the treatment surface, wherein the hollow shaft surrounds a condensation space, in which a condenser is arranged, the hollow shaft having through openings through which gaseous material components escaping from the material during the thermal treatment can enter the condensation space, and at least some of the spreading elements are configured as transport elements, which impart a transporting component to the material in the direction from the material inlet to the material outlet, wherein, at least in a longitudinal section of the rotor, some of the spreading elements are configured as transport elements and some as distributing elements, which project from the hollow shaft and which comprise teeth, the shearing edge of the teeth enclosing an angle of less than 45° relative to the axial direction.

2. The device as claimed in claim 1, wherein the shearing edge of at least some of the teeth of the distributing elements encloses an angle in a range of from 0 to 40°, relative to the axial direction.

3. The device as claimed in claim 1, wherein the transport elements comprise at least one transporting rib, the radial outer edge, of which encloses an angle greater than 45° relative to the axial direction.

4. The device as claimed in claim 1, wherein the transport elements each comprise an angular web plate, which is arranged at least approximately parallel to the axial direction and on the outer side of which at least one helically extending transporting rib is arranged.

5. The device as claimed in claim 1, wherein the distributing elements alternate with the transport elements in the circumferential direction of the rotor.

6. The device as claimed in claim 1, wherein the spreading elements are designed exclusively as transport elements in the inlet region and/or and the outlet region.

7. The device as claimed in claim 1, wherein said device has a splashguard completely surrounding the hollow shaft in the inlet region.

8. The device as claimed in claim 7, wherein the splash guard is formed by transport elements and by plates, each of said plates connecting two circumferentially successive transport elements.

9. The device as claimed in claim 1, wherein the number of spreading elements distributed in the circumferential direction is between 4 and 80.

10. The device as claimed claim 1, wherein the condenser comprises an inner tube and an outer tube concentrically surrounding the inner tube, wherein the inner tube and the outer tube each have an outer wall and an inner wall, wherein the inner tube and the outer tube are spaced apart from one another, at least in some region or regions, such that the inner wall and the outer wall of the inner tube form an inner-tube cooling-medium circulation duct in the inner tube and the inner wall and the outer wall of the outer tube form an outer-tube cooling-medium circulation duct in the outer tube, and the inner-tube cooling-medium circulation duct and the outer-tube cooling-medium circulation duct are fluidically connected to one another.

11. The device as claimed in claim 10, wherein a cooling-medium feed line opens into one of the two cooling-medium circulation ducts, and a cooling-medium outlet leads away from the other cooling-medium circulation duct.

12. The device as claimed in claim 1, wherein the housing has a vacuum connection, which is configured in such a way as to apply a vacuum directly to the condensation space.

13. The device as claimed in claim 12, wherein the vacuum connection opens into an upper part of the housing, which is fluidically connected to the condensation space and is sealed off from the treatment chamber.

14. The device as claimed in claim 1, wherein the rotor has at least two bearing shoes arranged symmetrically with respect to the axis in the outlet region and is guided radially by a bearing ring of the housing, which forms a material-lubricated bearing together with the bearing shoes.

15. The device as claimed in claim 1, wherein the condenser is surrounded concentrically by a static cover plate in the outlet region.

16. The device as claimed in claim 1, wherein the material outlet is in the form of a discharge hopper adjoining the treatment chamber in the axial direction.

* * * * *